March 3, 1942.   C. S. ASH   2,275,025
DUAL WHEEL ASSEMBLY
Filed Sept. 8, 1939   3 Sheets-Sheet 1

INVENTOR
Charles S. Ash
BY
Morgan Finnegan & Durham
ATTORNEYS

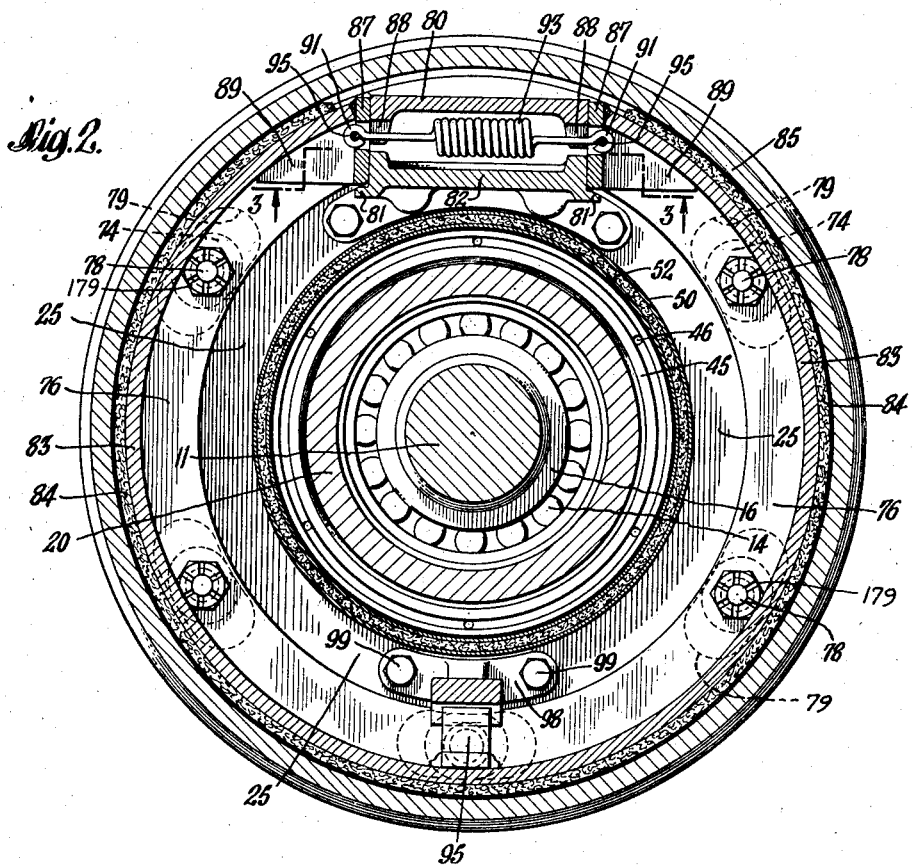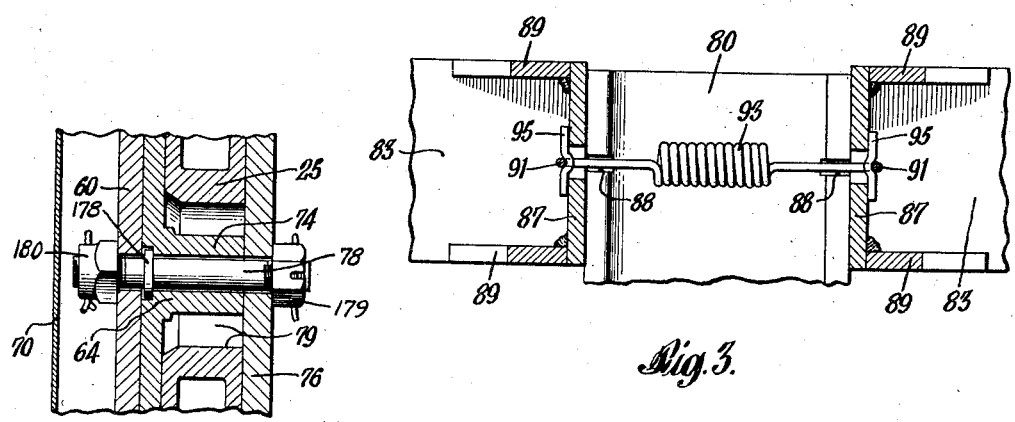

March 3, 1942.   C. S. ASH   2,275,025
DUAL WHEEL ASSEMBLY
Filed Sept. 8, 1939   3 Sheets-Sheet 3
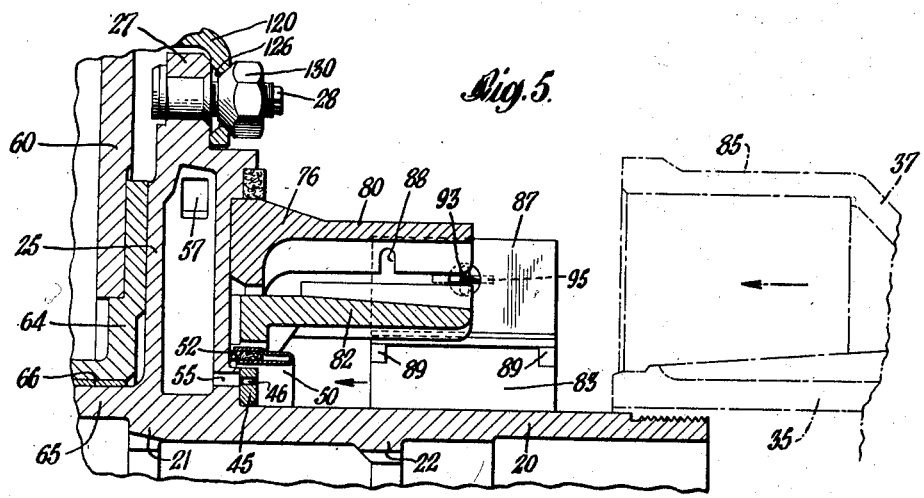
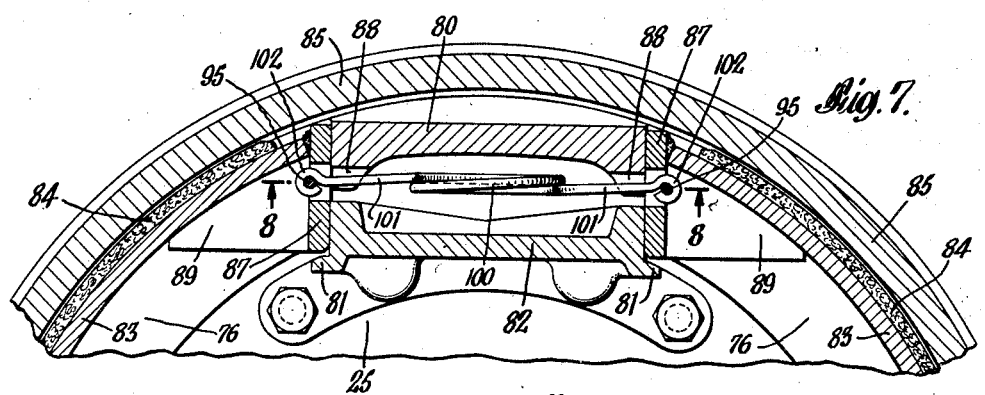
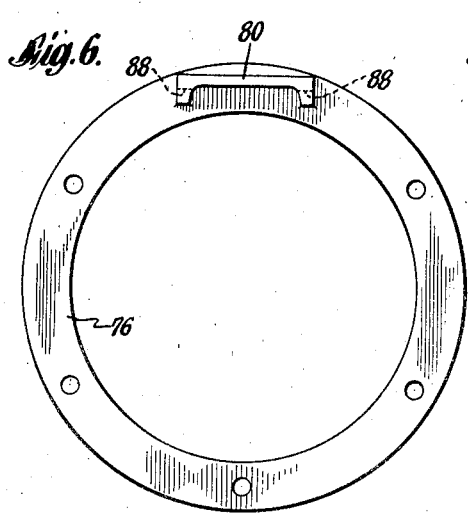
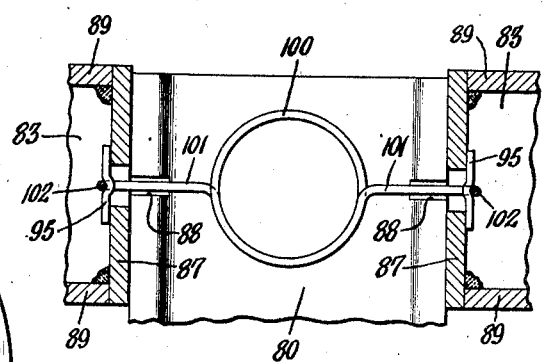

Patented Mar. 3, 1942

2,275,025

UNITED STATES PATENT OFFICE 2,275,025

DUAL WHEEL ASSEMBLY

Charles S. Ash, Milford, Mich.

Application September 8, 1939, Serial No. 293,912

7 Claims. (Cl. 188—18)

The present invention relates to improvements in brake mechanisms for vehicle wheels and particularly brake mechanisms of that type employing a split expansible and contractible brake or clutch band for engagement with a brake drum.

In my Patent No. 2,192,023, dated February 27, 1940, I have shown a dual wheel structure embodying a brake drum and a split resilient clutch band for cooperation therewith, said band having end abutments for coaction with a stop finger operating to prevent angular movement of the band relatively to the wheel and an actuating finger operable in a brake applying action to expand the band into engagement with the drum, said fingers being arranged in parallel relation to each other in the gap of the band and between and in contact with said abutments.

In such patented structure reliance is placed upon the normal resiliency of the band to effect its retraction, but it is found that the resiliency of the band may be reduced or destroyed by heat developed under continued use of the band so that its retractive action when released for contraction is impaired.

One object of the present invention is to provide a band retracting spring for use in a brake or clutch mechanism of this type, or any similar type, whereby a positive and reliable service contraction of the band is ensured at all times.

Another object of the invention is to provide a novel construction and arrangement of parts adapting the spring to be readily applied for use or removed for repairs or replacements when occasion requires, and which ensures the firm holding of the spring from displacement when mounted in operative position.

Still another object of the invention is to provide an arrangement whereby the spring is housed against possible injury while in service position and connected directly with the ends of the band for a most effective band retractive action thereon.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 2 is a cross section taken on the line 2—2 of Figure 1;

Figure 3 is a fragmentary sectional view taken on the line 3—3 of Figure 2;

Figure 4 is a fragmentary detail sectional view taken on the line 4—4 of Figure 1;

Figure 5 is a fragmentary, detailed sectional view, partially exploded, and showing the method of assembling the parts illustrated in Figures 1 to 4;

Figure 6 is a detailed elevation of the brake actuating ring employed in connection with the embodiment of Figures 1 to 5;

Figure 7 is a fragmentary detailed sectional view showing a modified form of brake actuating mechanism; and Figure 8 is a fragmentary sectional view taken on the line 8—8 of Figure 7.

Figure 1:
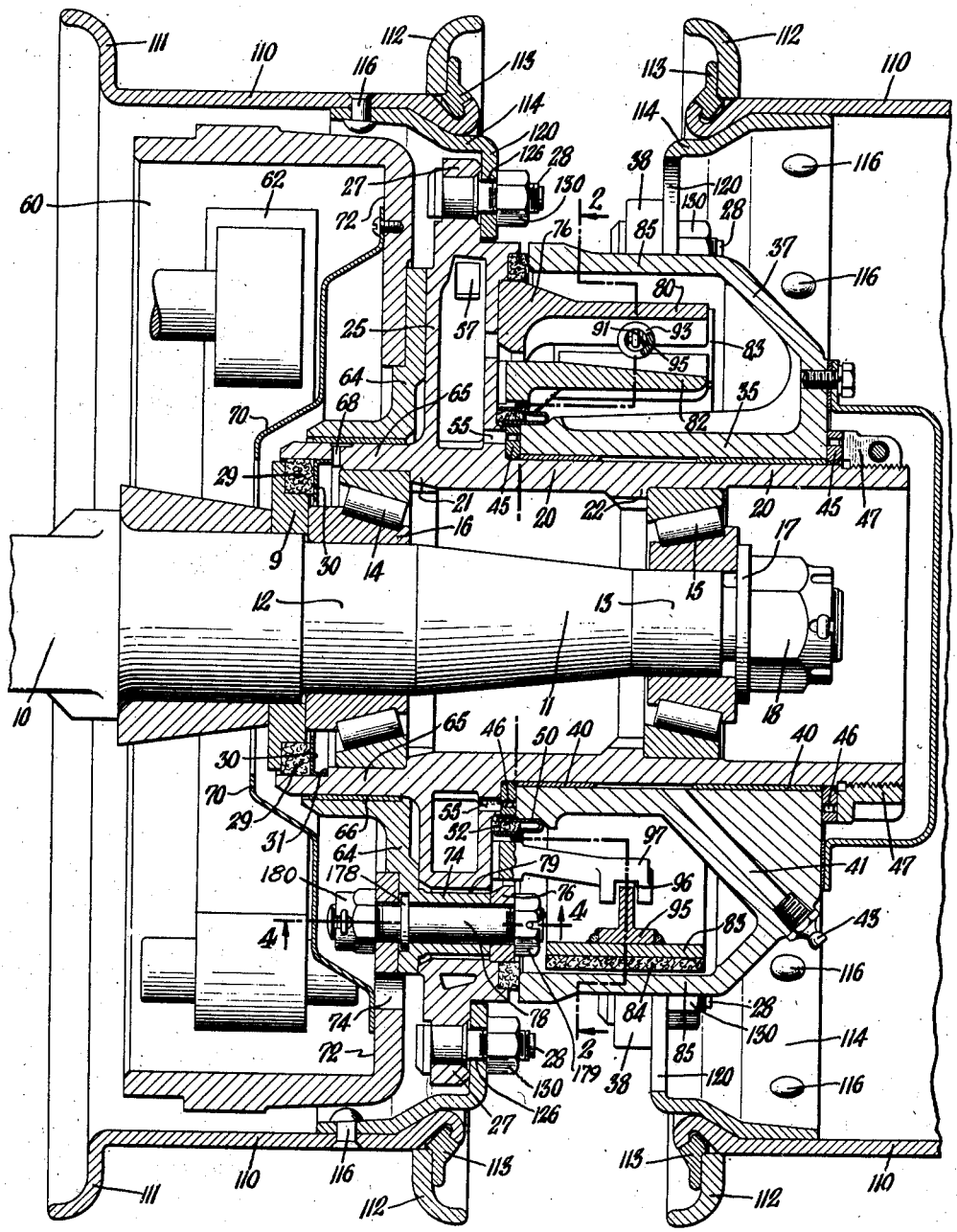
Figure 1 is a vertical sectional view through a typical and illustrative embodiment of the present invention.

It will be understood that the foregoing general statement of the objects, and the following detailed description as well, are exemplary and explanatory of the invention but are not restrictive thereof.

Referring now in detail to the illustrative embodiment of the invention as shown by the accompanying drawings, the invention is shown as applied to a dual wheel structure for trailer use and in which the dual wheels have their hubs telescopically arranged and relatively and independently rotatable with means for braking one of the wheels and for transmitting the braking force from one wheel to the other so that the two wheels may be simultaneously braked. On the end of the axle 10 is mounted the integral spindle 11 formed with the bearing seats 12 and 13 on which are supported the antifriction bearings 14 and 15 which are retained by means of the collar 16 and the washer 17 and nut 18. On the bearings 16 and 17 is mounted the elongated hub 20 which also serves to hold the bearings spaced apart by means of the shoulders 21 and 22.

Formed as an integral part of the hub 20 is the radially extending cored web portion 25 which forms a clutch mechanism supporting member, as will be later described, and terminates at its extreme peripheral portion in a plurality of short spoke-like members 27 which are apertured to receive the rim attaching bolts 28. Internally, hub 20 is enlarged near its inner end and receives the felt sealing ring 29 which is also supported by means of the shouldered collar 9 which also serves as the bearing shoulder for bearing 16, and also receives the metallic lubricant retaining ring 30 which is held tightly against the shoulder 31 by means of the felt ring 29.

The outer portion of hub 20 serves to rotatably support the hub portion 35 of the outer wheel so that the inner and outer wheels may rotate relatively to each other. As embodied, the outer hub 35 comprises a relatively long tubular member having a generally cylindrical interior at the outer end of which is integrally formed the spoke or wheel portion 37 which also terminated in the short spoke-like members 38 which are apertured to receive the rim retaining bolts 28 for the outer rim. To reduce the friction of relative rotation between the inner and outer wheels, narrow cylindrical bushings are provided between the inner surface of the outer hub 35 and the outer surface of the inner wheel hub 20. The bushings preferably comprise thin and somewhat narrow split cylinders of graphite bronze 40 which are split across their circumference at one point and are supported by means of an outer steel backing of considerable resiliency. This steel backing is integrally connected with the bronze backing bushing and when pressed in position within the outer hub is compressed to form a continuous cylinder so that the split leaves an unappreciable gap, the resiliency of the bushing serving to retain the bushings within the outer wheel hub as the outer wheel hub is removed telescopically from the inner wheel hub. Two such bushings are provided, one near each end of the outer hub 35, while the space between the bushings communicates with a grease duct 41 formed in the outer wheel hub 35 having at its outer end a grease fitting 43 through which grease may be introduced for the normal lubrication of the bushings 40, although the graphite bronze can be operated for relatively long periods of time without lubricant other than the graphite contained in the bronze.

In order to provide for the thrust between the two wheels such as is developed by the sway of the vehicle or while the vehicle is turning, a thrust washer 45 is provided at either end of the outer wheel hub 35, closely fitted to the circumference of the inner wheel hub and relatively thin. Each of the thrust washers 45 comprises an annular member of substantially uniform cross section which tapers inwardly to a relatively narrow surface which is tightly fitted to the outer cylindrical periphery of the inner hub 20. Between its inner and outer circumferences, the washer 45 is grooved on both of its faces, and these grooves are joined together by spaced apart holes 46 which pass through the thickness of the washer. These grooves are preferably formed with a sharp, narrow cylindrical shoulder for their outer edge so that lubricant passing through the holes 46 is distributed around the ring by centrifugal force developed by the rotation of the wheels, while the tapered inner faces of the washer provide small pockets between the washer and the hub for the same purpose. At the inner end of hub 35, the washer 45 is held closely between the cooperating surface at the junction of the outer cylindrical portion of hub 20 and the outer side of the radially inner portion of the brake supporting cored web 25 on one side of the washer and the finished end surface at the inner end of the outer hub 35. The other washer 45 is mounted between the outer finished end of the outer hub 35 and the inner finished surface of the threaded thrust ring 47, this ring being tightened so that there is only a very small amount of axial play between the inner and outer wheel hubs.

For retaining lubricant within the journals between the telescoping portions of the dual wheels, a sealing ring 50 is provided which is positioned between the shoulder of outer hub 35 and the radial web portion 25 of the inner wheel. This sealing ring 50 comprises a thin, resilient metal annulus generally U-shaped in section and provided with a felt ring 52 between its edges on its open side, the felt being pressed into tight contact with the radial surface 25 of the wheel.

Means are provided for conducting excess or leaking lubricant away from the brake and clutch means, and comprise a series of at least a few holes 55 in register with the groove of the inner thrust ring 45 and adapted to receive any lubricant which passes through the holes in the thrust ring. Holes 55 communicate with the hollow cored portion of the inner wheel and lead the excess lubricant into the cored portion of the wheel whence it may be discharged over the outer portion of the brake drum by passage through the holes 57.

The brake means for the inner wheel comprises the brake drum 60, the inner cylindrical surface of which is surfaced to cooperate with conventional brake shoes 62 which are mounted on the axle 10. Brake drum 60 is mounted for slight relative rotation with respect to the inner wheel by means of a collar 64 which is journalled on the inwardly extending tubular portion 65 of the hub by means of the steel backed graphite bronze bushing 66, similar to the bushings 40. The inner surface of the bronze bushing 66 is normally supplied with lubricant from the inner tapered roller bearing by means of the oil ducts 68 piercing the inner tubular extension 65 of the inner wheel hub and positioned just outside the bearing seal 30. A shield plate 70, fastened at its rim to the inner face of the brake drum 72, is centrally apertured to fit over the axle 10 and prevents the leakage of grease from the bushing 66 onto the inner surface of the brake. Any lubricant which accumulates in the shield plate 70 drains out through an aperture 74 in the brake drum so that it is discharged between the brake drum and the tire rim on the inner wheel.

Collar 64 is provided with outwardly extending portions 74 which serve both to limit the relative rotation of the brake drum 60 and to transmit the relative rotation from the brake drum to the clutch actuating finger so as to apply the braking force from the inner wheel to the outer wheel. The limitation of the relative rotation between the brake drum 60 and the inner wheel may be attained by providing the cored portion 25 of the inner wheel with relatively short circular slots 79 through which the portions 74 project. On the outer face of the cord web portion 25 of the inner wheel, an annular recess is provided in which is rotatably seated the clutch actuating or expanding ring 76 connected to the collar 64 by means of the studs 78. Studs 78 may be so constructed as to serve the double purpose of securing the collar 64 and expanding ring 76 in their assembled relation on cored portion 25 and removably securing the brake drum 60 on the collar 64 in such manner as to permit the drum 60 to be removed or attached without disturbing the relation of collar 64 and expanding ring 76. As constructed stud 78 is threaded on each end and provided near its inner end with a flange 178 which seats in a counter-bore in the inner face of collar 64. The outer end of stud 78 carries a nut 179 which clamps between it and the flange 178, the collar 64 and expanding ring 76, and the inner end is provided with a nut 180 whereby the drum 60 may be secured to collar 64.

Clutch expanding ring 76 is formed with an axially and outwardly extending finger 80 of the same width as the stationary finger 82 formed as a bracket and bolted to the outer face of the inner wheel to extend parallel to the finger 80. The forward and rear edges of the fingers 80 and 82 are preferably in parallel planes, and at its lower side the finger 82 is provided with small lips 81 which serve to seat the adjacent edges of the brake or clutch shoe.

The clutch shoe between the wheels comprises a band 83 of steel or other resilient material onto the outer surface of which is secured a lining of friction material 84, such as brake lining, and this band is shaped so that it has a normal unexpanded shape which is circular and slightly smaller than the cylindrical portion 85 of the clutch drum formed as an integral portion of the outer wheel. The ends of the clutch band 83 are each provided with a welded abutment plate 87 which is braced by means of the triangular pieces 89 so as to hold the plates parallel to each other and to the forward and rear edges of the fingers 80 and 82. The radial inner edges of the plates 87 cooperate with the lips 81 so as to locate the clutch band in its proper position.

In order to provide a more positive resilient contraction of the clutch band 83 than can be obtained by sole reliance on the normal resiliency of the steel band 83 which tends to be destroyed by heat developed during continued use of the clutch, the plates 87 are apertured to receive the looped ends 91 of the tension spring 93 which is stretched between the plates 87 and is held in position by means of the pegs 95 passing through the eyes at the ends of the spring.

In order to facilitate the assembly and disassembly of the clutch mechanism, the spring 93 is made so that its vertical dimension is relatively small, and as shown in Figure 2, the spring is of a relatively small diameter which is so related to the space between the fingers 80 and 82 that the spring may be passed in and out between the outer ends of these fingers, thereby permitting the spring and clutch band to be assembled before they are moved into place within the clutch drum 85. The under face of the expander finger 80 and the upper face of the anchoring or stationary finger 82 may be recessed axially of the assembly so as to increase the diameter of spring which may be used for bringing the clutch to its retracted position and to hold the spring from displacement longitudinally of the fingers. By the structure described provision is made for mounting the spring between the fingers whereby the spring is connected directly with the abutments at the ends of the band so that its full force may be exerted on the band at the most effective point and in the most effective manner. Furthermore, in this structure the abutments and fingers form the walls of a chamber in which the spring is housed and with which walls the spring is engaged to hold it from disconnection at either end or from displacement longitudinally or transversely of the chamber.

Means are provided near the bottom of the clutch assembly for guiding the clutch shoe 83 and these means may comprise a T 95 welded to the inner face of the steel clutch band 83 and extending radially upward into the downwardly opened slot 96 at the end of the outwardly extending arm 97 of bracket 98 which is bolted to the wheel web 25 by means of the bolts 99.

When the vehicle is to be stopped, the brake shoes 62 are expanded into braking contact with the brake drum 60, causing collar 64 to be rotated relatively to wheel 25. That is, wheel 25 continues to roll over the road and as the brake is applied, the brake drum is held so that it does not move in complete unison with the wheel, this holding back continuing until the brake drum has been displaced angularly with respect to the wheel an amount dependent upon the pressure with which the brake is applied. This relative movement of the brake drum 60 and the outwardly extending portion 74 transmit their relative rotary motion to the clutch actuating ring 76 and thereby to the clutch expanding finger 80 so that the finger 80 is shifted to one side or the other, forwardly or rearwardly, placing the edges of finger 80 out of line with the underlying edges of the finger 82 which is stationary relative to the wheel 25. This relative movement of the fingers 80 and 82 against the tension of spring 93 serves to expand the clutch band 83 into clutching engagement with the clutch drum 85, and retarding the rotation of the outer wheel at the same time that the rotation of the inner wheel is directly retarded by the brake shoes. By increasing the pressure on the brake shoes, sufficient pressure may be developed between the clutch band 83, 84 and the clutch drum 85 so as to prevent independent rotation of the dual wheels and thereby cause the application of an equal braking effort to both wheels.

Figure 5 illustrates the manner in which the dual wheels are assembled with their clutch mechanism, and this view shows the clutch actuating finger 80 and the stationary finger 82 in assembled position on the inner wheel. The clutch band 83 and its associated parts including spring 93 may then be moved into position by axial movement, the spring ends being passed through the narrow slot formed between the adjacent sides of the fingers 80 and 82. The T 95 may then be inserted in the slot 96 by pushing downwardly on the clutch band, deforming it and the spring 93 to a slight extent. When the clutch band is pushed completely home, the lower edges of the end plates 87 are raised up on to the lips 81 and the ends of the spring are then received within the notches 88 formed on the under side of the edges of finger 80, thereby serving to hold the clutch band in a definite position against axial or eccentric movement. When these parts have been assembled, the outer wheel assembly may be slid into place, the outer thrust washer 45 may be applied and the entire assembly held in final position by screwing on the lock nut 47.

Figures 7 and 8 illustrate a modified form of clutch retracting spring and as shown in the drawings is a relatively flat coiled spring 100 comprising one and a half convolutions of relatively stiff spring wire with the ends 101 of the spring extending diametrically away from the coil and being formed into loops 102 at each end. These loops or eyes may be secured within the apertures in end plates 87 by means of pegs 95, as in the other embodiment.

Means are provided for accurately mounting the tires and rims on their respective wheels so that the tires and their rims may be easily and quickly mounted and demounted, at the same time insuring absolute true running of the tires. As embodied, the rims are provided with inwardly extending reinforcing means which not only strengthen the rim but also serve to secure the rim to the wheel. As shown in Figure 1, the pneumatic tire (not shown) is adapted to be mounted upon a rim 110, having an inner wall 111 and a removable outer wall 112 held in place by retaining ring 113. On the interior of the rim and adjacent one edge thereof, preferably the edge supporting the retaining ring 113, there is provided an annular ring 114 of relatively heavy section having its outer surface shaped to conform to the inner edge surface of the rim 110, and this ring is secured to the rim by a plurality of rivets 116. Ring 114 is provided with a plurality of evenly spaced generally rounded lugs or projections 120 extending radially inwardly and substantially in line with the edge of the rim 110 and these projections are apertured as at 126 to register with and receive the rim mounting bolts 28 which project outwardly from the inner wheel, the rim being securely and accurately fastened to the wheel by means of the retaining nuts 130.

The outer wheel rim is preferably a duplicate of the inner wheel rim, and is mounted in a similar manner, but on the outer wheel, at least, the spaces between the adjacent short spoke-like projections 38 are of reduced diameter so as to permit the passage of the projections 120 on the inner wheel rim as the inner wheel tire and rim are moved in the mounting or demounting of the inner wheel tire and rim. Thus, when an inner tire is to be changed it is only necessary to remove the outer tire and rim and the retaining nuts 130 on the inner wheel.

The invention in its broader aspects is not limited to the specific mechanisms shown and described but departures may be made therefrom within the scope of the accompanying claims without departing from the principles of the invention and without sacrificing its chief advantages.

What I claim is:

1. In a clutch for transmitting braking effort from one wheel part to another relatively movable wheel part, a drum carried by one wheel part, a split annular clutch band mounted on the other wheel part within the drum, said band having spaced substantially parallel end abutments provided with openings therein, and means for actuating the band including a finger fast to one wheel part, a finger movable relatively thereto and with the other wheel part, said fingers being arranged adjacent each other and between the end abutments of the band, and a band contracting spring disposed between the fingers and extending transversely thereof between the end abutments of the band and having end portions projecting through the openings in the abutments and held in engagement with said abutments.

2. In a clutch for transmitting braking effort from one wheel part to another relatively movable wheel part, a drum carried by one wheel part, a split annular clutch band mounted on the other wheel part within the drum, said band having spaced substantially parallel end abutments provided with openings therein, and means for actuating the band including a finger fast to one wheel part, a finger movable relatively thereto and with the other wheel part, said fingers being arranged adjacent each other and between the end abutments of the band and at least one of said fingers being provided with seat recesses, and a band contracting spring disposed between the fingers and extending transversely thereof between the end abutments of the band and having end portions engaging said seat recesses and projecting through the openings in the abutments and held in engagement with said abutments.

3. In a clutch for transmitting braking effort from one wheel part to another relatively movable wheel part, a drum carried by one wheel part, a split annular clutch band mounted on the other wheel part within the drum, said band having spaced end abutments provided with openings, and means for actuating the band including a finger fast to one wheel part, a finger movable relatively thereto and with the other part, said fingers being arranged adjacent each other and between the end abutments of the band, a band contracting spring disposed between the fingers and extending transversely thereof between the end abutments of the band and having end portions passing through the openings in the abutments and provided with keepers, and retainers engaging the keepers and holding the ends of the spring engaged with the abutments.

4. In a clutch for transmitting braking effort from one wheel part to another, a drum carried by one wheel part, a split annular clutch band mounted on the other wheel part and within the drum, said band having spaced substantially parallel end abutments formed with openings therein, and means for actuating the band including a finger fast on one wheel part, said fingers being fixed at one end to the respective wheel parts and arranged in spaced relation adjacent each other and between the end abutments of the band and having free end portions, at least one of said fingers being provided with keeper recesses in alinement with the openings in the abutments, a band contracting spring housed in the space between the fingers and extending between said end abutments of the band, said spring being insertible and removable via the space at the free ends of the fingers and having end portions engaging said seat recesses and projecting through the openings in the abutments, and retaining means engaging the projecting ends of the spring to hold the spring engaged with said abutments.

5. In a clutch for transmitting braking effort from one wheel part to another relatively movable wheel part, a drum carried by one wheel part, a split annular clutch band mounted on the other wheel part and within the drum, said band having substantially parallel spaced end abutments provided with openings, and means for actuating the band including a finger fast to one wheel part, a finger movable relatively thereto and with the other wheel part, said fingers being arranged adjacent each other and between the end abutments of the band and formed to provide a spring receiving chamber, a band disposed in the chamber between the fingers and extending transversely of the fingers between the end abutments of the band and having end portions projecting outwardly through the openings in the abutments and provided with keepers, and retaining pins bridging said openings and engaging said keepers to hold the ends of the spring engaged with the abutments.

6. In a clutch for transmitting braking effort from one wheel part to another relatively movable wheel part, a drum carried by one wheel part, a split annular clutch band mounted on the other wheel part and within the drum, said band having spaced end abutments, and means for actuating the band including a finger fast to one wheel part, a finger movable relatively thereto and with the other wheel part, said fingers being arranged in spaced relation adjacent to each other and lying between and in lateral contact with the end abutments of the band, and a band contracting spring disposed between the fingers and extending transversely thereof between and engaged with the end abutments of the band at points substantially equidistant between the points of contact of the fingers with the abutments.

7. In a clutch for transmitting braking effort from one wheel part to another relatively movable wheel part, a drum carried by one wheel part, a split annular clutch band mounted on the other wheel part and within the drum, said band having substantially parallel end abutments, and means for actuating the band including a finger fast to one wheel part, a finger movable relatively thereto and with the other wheel part, said fingers having free ends and being arranged in spaced relation to and substantially parallel with each other and in lateral contact with the abutments and forming with the abutments walls of a spring receiving chamber provided with an entranceway between said free ends, and a spring arranged in said chamber between the abutments and insertible and removable through said entranceway, the walls and spring having interengaging portions coupling the spring to the abutments and holding the spring from displacement longitudinally or transversely of the chamber.

CHARLES S. ASH.